(12) United States Patent
Rapin et al.

(10) Patent No.: US 7,975,567 B2
(45) Date of Patent: Jul. 12, 2011

(54) DEVICE FOR CONTROLLING A GEARBOX

(75) Inventors: Georges Rapin, Thyez (FR); Jean-Pierre Baz, Passy (FR)

(73) Assignee: Teleflex Automotive France SAS, Cluses (FR)

( * ) Notice: Subject to any disclaimer, the term of this patent is extended or adjusted under 35 U.S.C. 154(b) by 743 days.

(21) Appl. No.: 11/961,174

(22) Filed: Dec. 20, 2007

(65) Prior Publication Data
US 2008/0167159 A1    Jul. 10, 2008

(30) Foreign Application Priority Data
Jan. 10, 2007   (FR) ...................................... 07 00158

(51) Int. Cl.
*F16H 59/04*   (2006.01)
*G05G 9/047*   (2006.01)
(52) U.S. Cl. ................. 74/473.35; 74/471 XY
(58) Field of Classification Search .................. 74/473.1,
74/473.15, 473.21, 473.25, 473.3, 473.35,
74/473.36, 473.37, 473.24, 473.335, 335;
248/206.5, 683; 403/DIG. 1
See application file for complete search history.

(56) References Cited

U.S. PATENT DOCUMENTS
4,648,283 A * 3/1987 Janson ....................... 74/473.24
6,892,600 B2 * 5/2005 Onuma et al. ............. 74/473.24

FOREIGN PATENT DOCUMENTS
DE   42 40 298 A1   6/1994
EP   1 429 056 A1   6/2004

OTHER PUBLICATIONS
French Search Report for Application No. FR 07/00158; Search completed on Sep. 19, 2007.

* cited by examiner

*Primary Examiner* — Thomas R Hannon
*Assistant Examiner* — Phillip A Johnson
(74) *Attorney, Agent, or Firm* — Alston & Bird LLP

(57) ABSTRACT

A device for controlling a gearbox, in particular for a motor vehicle, comprising fixed permanent magnets, mounted on a gearbox casing and cooperating by magnetic attraction or repulsion with a mobile permanent magnet mounted on a transmitter member driving into rotation or translation a shaft for selecting and/or changing gears, in order to define stable gear selecting or changing positions.

10 Claims, 3 Drawing Sheets

DEVICE FOR CONTROLLING A GEARBOX

FIELD OF THE INVENTION

The invention relates to a device for controlling a gearbox, in particular for a motor vehicle.

BACKGROUND OF THE INVENTION

From document EP-A-1429056, a lever device is known for controlling a gearbox, wherein a permanent magnet mounted on the lever is displaceable with the lever facing a fixed magnet with which it cooperates by magnetic attraction for maintaining the lever in a stable position. This device cannot provide the return of the lever when the latter is moved away from its stable position and it is therefore necessary to associate with the lever, return springs as well as ball detent means forming hard points between the stable positions of the lever, and means for filtering vibrations, which are mounted on the components connecting the lever to the gearbox.

The setting up of these return, ball detent, and filtering means is expensive and their use is expressed by wear of the parts in contact.

SUMMARY OF THE INVENTION

The object of the invention is notably to avoid these drawbacks of the prior art.

For this purpose, the invention proposes a device for controlling a gearbox, in particular for a motor vehicle, comprising at least one mobile permanent magnet displaceable by a control lever in front of a group of fixed permanent magnets borne by a support and cooperating by magnetic attraction or repulsion with the mobile magnet so as to define at least one position of the lever and to compensate the play of the lever in this position, wherein the mobile magnet is borne by a transmitter means driving the end of a shaft for selecting or changing gears emerging from the gearbox casing and wherein the group of fixed magnets is borne by the gearbox casing.

The device according to the invention has many advantages as compared with the prior art:
  it reduces the plays in the stable positions of the control lever,
  vibrations and noises are significantly damped at the exit of the gearbox and are no longer transmitted with resonances through the gear control cables or rods,
  the means for filtering noises and vibrations, mounted in the prior art on the cable end pieces or cladding stops are reduced or suppressed,
  inertia at the lever is increased, because of the reduction gear ratio between the different control members, and the force felt at the lever is smaller, which improves pleasure in maneuvering the lever during gear ratio changes,
  the devices for controlling a gearbox may further be standardized, which provides reduction in the number of versions of these devices which may be used with a same gearbox (presently four versions of control devices are generally required for a same gearbox) and also an increase in the manufacturing volumes of various versions of control devices and thus a reduction in their costs.

According to another feature of the invention, the fixed permanent magnets are borne by a component mounted in an orifice of the gearbox casing for guiding and sealing the shaft at its exit from the gearbox.

Preferably, the fixed permanent magnets comprise magnets having a first polarity, which are moved away from each other along at least one trajectory of the mobile magnet in order to define several positions of the lever, and permanent magnets having a second polarity, which are placed between the magnets having the first polarity in order to generate forces restoring the lever towards its aforementioned positions and/or to create ball detent points between these positions.

In a first embodiment of the invention, a first mobile magnet is attached on a transmitter means integral with the end of a gear selection shaft at its exit from the casing and is displaceable in front of three fixed magnets which have a polarity opposite to that of the mobile magnet.

A second mobile magnet is attached on a transmitter means integral with the end of a gear changing shaft at its exit from the casing and is displaceable facing three other fixed magnets which have a polarity opposite to that of the second mobile magnet.

Stable positions of the lever may thereby be determined, which correspond to predetermined positions for selecting and changing gears, and forces for restoring the lever in its stable positions and/or ball detent forces between these positions may thereby be generated.

In an alternative embodiment of the invention, a first mobile magnet is borne by a first transmitter means connected to the end of a gear selecting and changing shaft at its exit from the casing in order to drive this shaft into rotation around its axis (or in translation along this axis) and is displaceable in front of fixed magnets defining gear selection positions.

A second mobile magnet is borne by a second transmitter means connected to the end of the gear selecting and changing shaft at its exit from the casing in order to drive this shaft into translation along its axis (or in rotation around this axis) and is displaceable in front of fixed magnets defining gear changing positions.

Advantageously, the fixed permanent magnets comprise magnets with a first polarity, which are moved away from each other along at least one trajectory of the mobile magnet displaceable by the lever, in order to define positions of the lever, and magnets having a second polarity, which are positioned around magnets having the first polarity for generating forces for maintaining and restoring the lever in its aforementioned positions.

The magnets having the second polarity may be ring-shaped magnets which each surround a magnet with the first polarity.

According to another feature of the invention, the gear selecting and/or changing shaft is connected to a reduction gear housed in a gearbox outlet casing.

Possibly, the gear selecting and/or changing shaft is connected through this reduction gear to an inertial mass housed in the gearbox outlet casing, this inertial mass being formed by a disk or a crown guided upon rotation on the gear selecting and/or changing shaft.

This feature of the invention allows inertia to be added in the gear control and better filtering of the impacts, noises, and vibrations transmitted by this control. The inertial mass which is optionally connected to the gear selecting and/or changing shaft through the reduction gear is much more reduced than in the prior art. Consequently, it is less bulky and less costly and requires less energy for its setting into motion.

Generally, with the invention, it is possible to improve the acceptance and accuracy of the control of a gearbox, while reducing the transmission of impacts, noises and vibrations from the gearbox towards the control lever.

BRIEF DESCRIPTION OF THE DRAWINGS

The invention will be better understood and other features, details and advantages thereof will become more clearly apparent upon reading the description which follows, made as an example with reference to the appended drawings wherein.

DETAILED DESCRIPTION OF THE PREFERRED EMBODIMENTS

Figure 1:
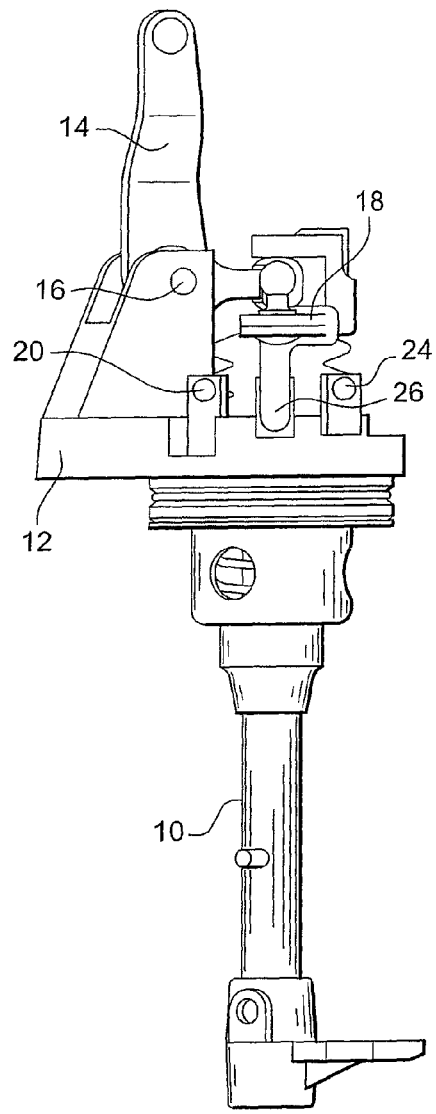
FIGS. 1 and 2 are front and side views of a gearbox outlet module comprising a shaft for selecting and changing gear.
Figure 2:
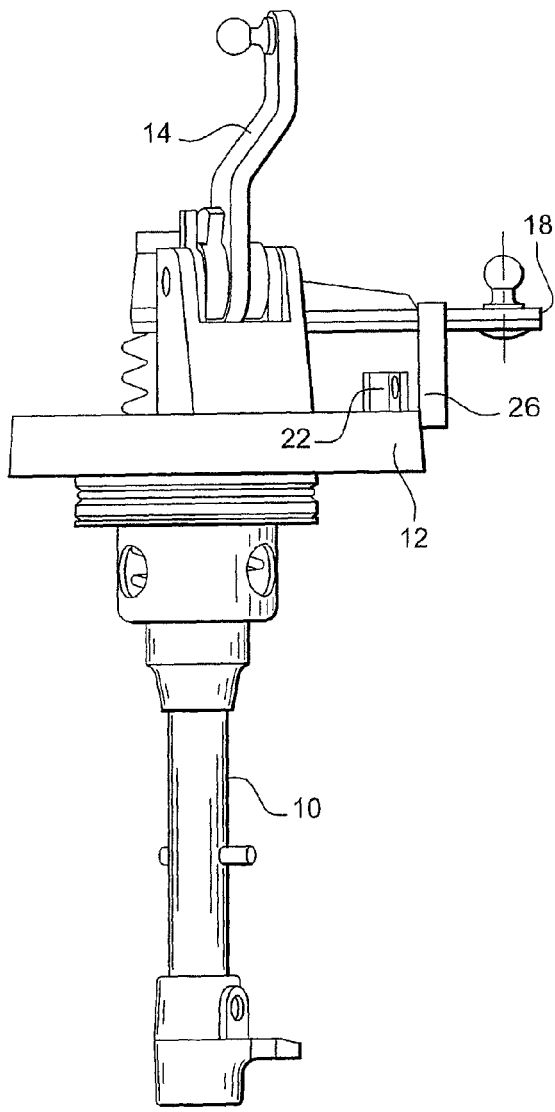

A gearbox outlet module is schematically illustrated in FIGS. 1 and 2, which comprises essentially a shaft 10 for selecting and changing gears, the upper end of which is guided in rotation and translation in a cylindrical component 12 intended to be sealably mounted in an orifice of the gearbox casing, in particular of a motor vehicle, so that the major portion of the shaft 10 extends inside the gearbox and its upper end is external to the gearbox.

This upper end is connected by shape matching to a first transmitter member 14 which is pivotably mounted around a transverse axis 16 on the cylindrical component 12 in order to displace the shaft 10 in translation along its longitudinal axis, this upper end of the shaft 10 being also connected to another transmitter member 18 intended to drive the shaft 10 into rotation around its longitudinal axis. In a standard way, both transmitter members 14, 18 are connected, for example via cables, to a control lever L which is maneuverable by the driver of the vehicle for selecting and changing gears.

Three fixed permanent magnets 20, 22 and 24 are mounted on the cylindrical component 12 along the trajectory covered by another permanent magnet 26 borne by the transmitter member 18 when the lever L is maneuvered by the driver of the vehicle, in order to define one or more stable positions of the lever, corresponding to one or more predetermined positions for selecting or changing gears, and possibly forces for restoring the lever into at least one of its positions and/or ball detent forces between the positions of the lever.

The magnet 26 borne by the transmitter member 18 has a certain polarity, for example a positive polarity, on its face turned towards the permanent magnets 20, 22 and 24 borne by the cylindrical component 12. The faces of these magnets turned towards the mobile magnet 26 have polarities opposite to those of this face of the magnet 26, for example negative polarities, in order to define positions in which the transmitter member 18 and therefore the lever L are substantially held without play. For example this may be a central neutral position, defined by the fixed magnet 22 which is found between both fixed end magnets 20 and 24, and two gear changing positions, one of which is defined by the fixed end magnet 20 and the other one by the fixed end magnet 24.

Alternatively, when the transmitter member 18 controls the selection of the gears, the central fixed magnet 22 may have a polarity which defines a stable neutral position by magnetic attraction from the mobile magnet 26, both fixed end magnets 20 and 24 having polarities opposite to that of the fixed central magnet 22 so as to exert on the mobile magnet 26 magnetic repulsion forces restoring the magnet 26 and therefore the transmitter member 18 and lever L towards the central neutral position.

The transmitter member 14 which drives the shaft 10 into translation along its longitudinal axis may also bear a permanent magnet displaceable facing fixed permanent magnets borne by the cylindrical component 12, in order to define stable position(s) of the shaft 10 and possibly generate restoring and/or ball detent forces on either side of this stable position or these stable positions.

By mounting fixed permanent magnets on the cylindrical component 12 of the gearbox outlet module and permanent magnets on the transmitter members 14, 18, it is possible to reduce or suppress the plays and vibrations directly at the exit of the gearbox and therefore not to transmit them with possible resonance effects as far as the control lever L.

Figure 3:
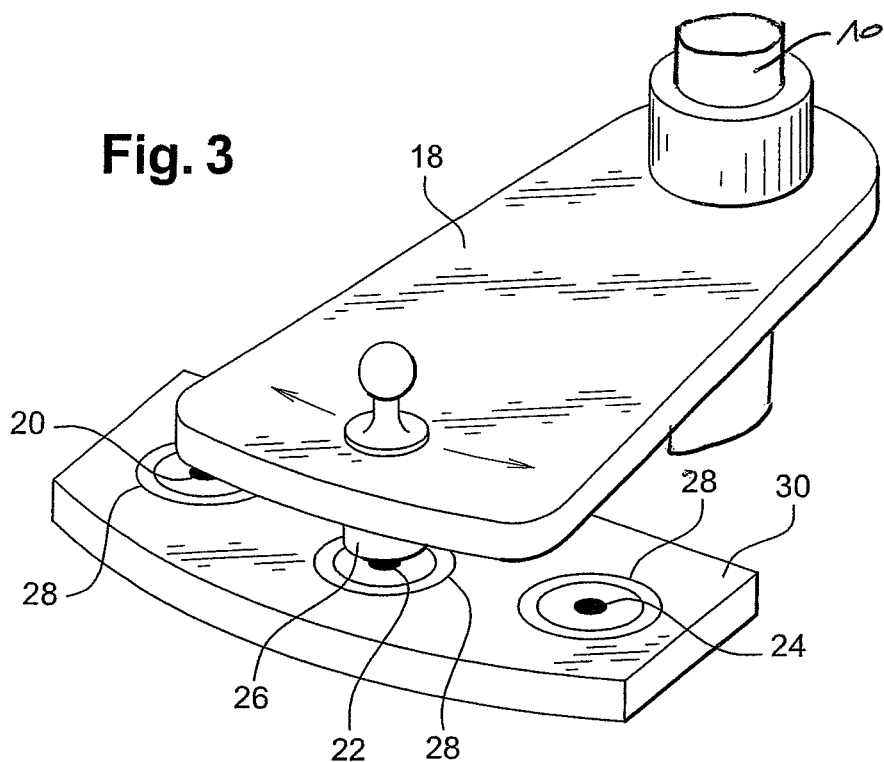
FIG. 3 is a schematic perspective view of an embodiment detail of the invention.

The stability of the positions defined by the magnets borne on the cylindrical component 12 may be improved by means illustrated in FIG. 3. In this figure, one of the aforementioned transmitter members, for example the member 18 bears a permanent magnet 26 which is displaceable facing three fixed permanent magnets 20, 22 and 24 as already described, with a polarity opposite to that of the mobile magnet 26 in order to exert on it a magnetic attraction force, each of the fixed permanent magnets 20, 22 and 24 being surrounded by a ring-shaped magnet 28 of opposite polarity which exerts a magnetic repulsion force on the mobile magnet 26 borne by the transmitter member 18.

With the system of FIG. 3 it is therefore possible to define three stable positions of the transmitter member 18, in each of which the mobile magnet 26 is held by magnetic attraction with the fixed magnets 20, 22, 24 which it faces and by magnetic repulsion with the ring-shaped magnet 28 which surrounds this fixed magnet.

This device may in particular be applied to the case when the gearbox comprises a gear selecting shaft and a gear changing shaft which are both driven into rotation around their longitudinal axis by transmitter members actuated by the control lever handled by the driver of the vehicle. The fixed magnets 20, 22, 24, 28 may then be directly mounted on the cylindrical component 12 which closes an orifice of the gearbox casing, or else may be borne by a platelet 30 which is then attached onto the gearbox casing or onto a gearbox outlet module.

Figure 4:
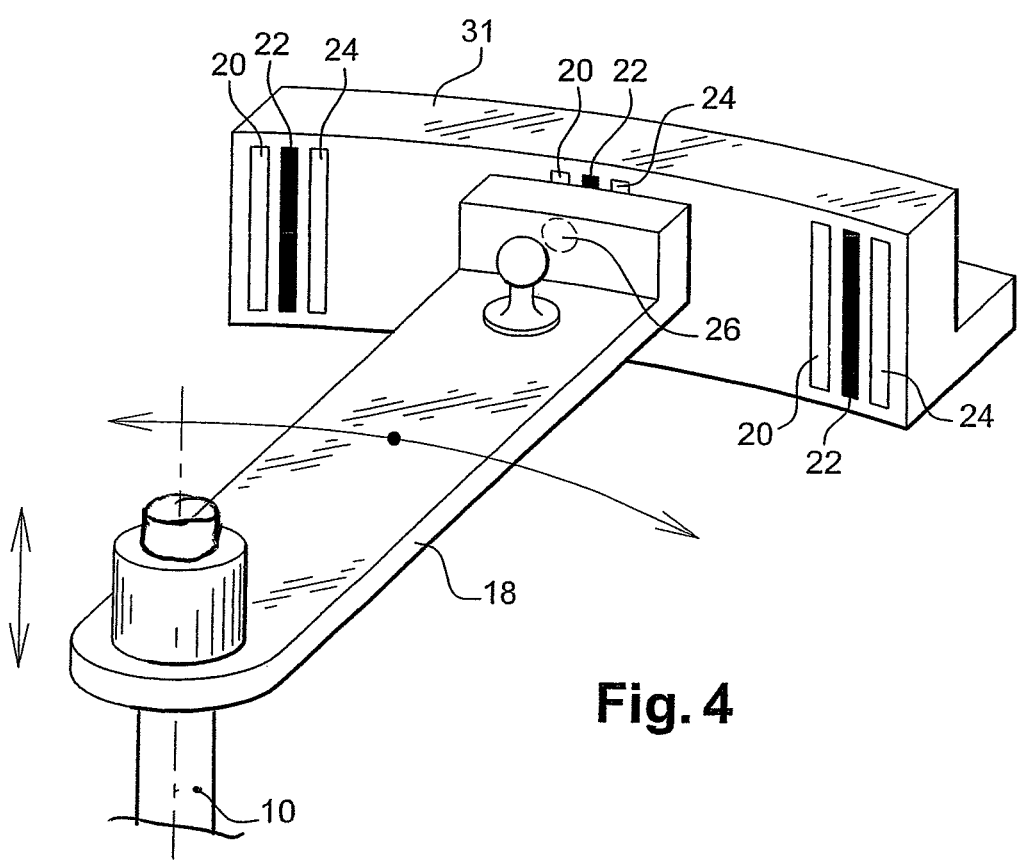
FIG. 4 is a schematic perspective view of an alternative embodiment.

In the alternative embodiment illustrated in FIG. 4, the gearbox outlet shaft 10 bears a transmitter member 18 extending perpendicularly to the axis of the shaft 10 and bearing at its free end a mobile magnet 26 which is displaced in translation parallel to the gear selection shaft 10 and in rotation around this shaft for changing gears.

This mobile magnet 26 is displaceable facing the three groups of fixed magnets 20, 22, 24 borne by a cylindrical rim 31 added onto the casing of the gearbox outlet module or belonging to this casing.

The three groups of magnets are distributed over the trajectory of the mobile magnet 26 displaced in rotation, one in the middle and the two other ones at the ends of this trajectory.

Each group comprises a central magnet 22 having a polarity opposite to that of the mobile magnet 26 facing it, and two magnets 20, 24 placed on either side of the central magnet 22 and having a polarity opposite to that of the central magnet 22, so that each group of magnets 20, 22, 24 defines a stable position of the mobile magnet 26 and exerts on the latter, magnetic forces for restoring it towards this stable position.

The magnets 20, 24 are located on either side of the central magnet 22 on the trajectory in rotation of the mobile magnet 26.

Moreover, the fixed magnets 20, 22, 24 are rectangular and extend parallel to the shaft 10 over a length substantially equal to the travel of the mobile magnet 26 displaced in translation parallel to the shaft 10.

Thus, the three groups of fixed magnets 20, 22, 24 provide the stability of the mobile magnet 26 in all its neutral gear, gear selecting and changing positions, and exert on it magnetic forces for restoring it towards these stable positions.

Figure 5:
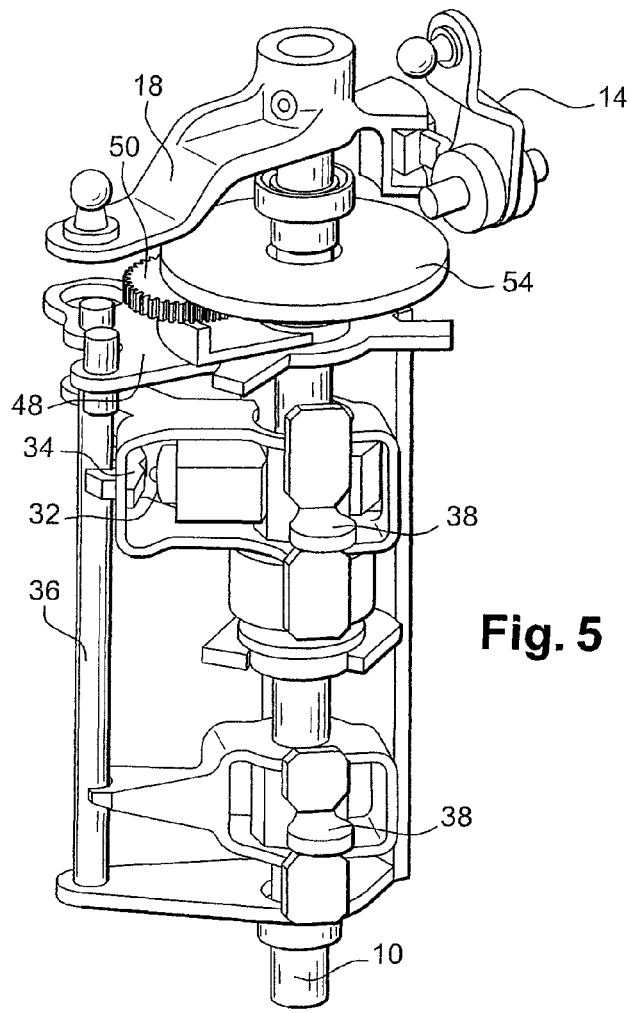
FIG. 5 is a schematic perspective view of another gearbox outlet module according to the invention.
Figure 6:
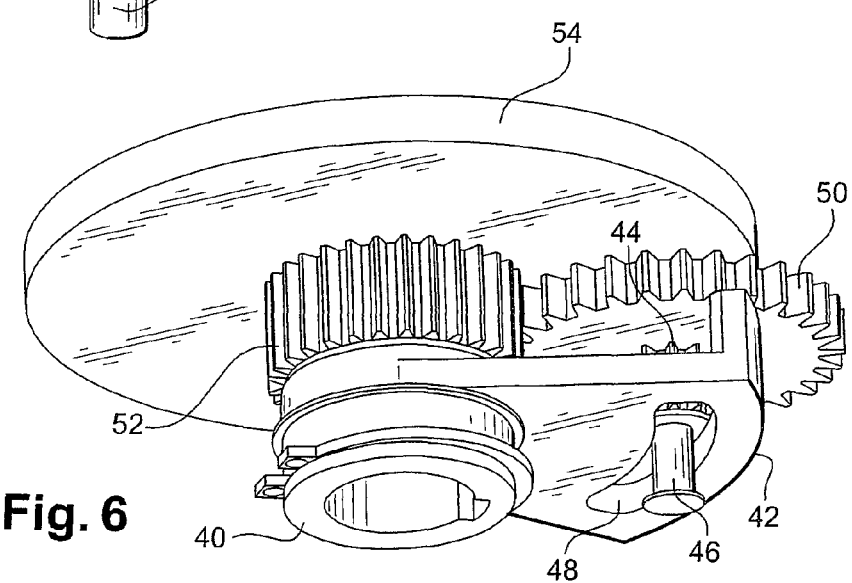
FIG. 6 is a schematic perspective view at a larger scale of a reduction gear for driving an inertial mass.

It may also be advantageous, as illustrated in FIGS. 5 and 6, to associate a reduction gear and an inertial mass to a gear selecting and/or changing shaft 10.

In the exemplary embodiment of FIGS. 5 and 6, the shaft 10 is used for selecting and changing gears, its upper end being connected to a transmitter member 14 on the one hand which allows it to be displaced in translation along its longitudinal axis and to a transmitter member 18 which allows it to be displaced in rotation around its axis.

In a standard way, the portion of the shaft 10 which extends inside the gearbox, bears ball detent means 32 which cooperate with fixed stops 34 mounted on the chassis 36 of the gearbox outlet module and with fingers 38 for engaging forks. The upper portion of the shaft 10 which is found inside the gearbox outlet module, is firmly attached in rotation, for example by means of a key, with a ring 40 crossed by the shaft 10 and which is integral with a toothed sector 42 which engages with a small pinion 44, the axis of which 46 is supported and guided in rotation by a transverse plate 48 of the chassis. This axis 46 moreover extends into a lumen 48 of the toothed sector 42 in order to limit the angular displacement of the toothed sector and therefore of the shaft 10 to which it is firmly attached in rotation.

This small pinion 44 is integral with a toothed wheel 50 of a larger diameter, coaxial with the pinion 44 and engaging with another toothed wheel 52 rotatably mounted around the shaft 10 and bearing an inertial mass 54 for example formed by a disk centered on the axis of the shaft 10 or by a crown guided in rotation on this shaft.

The reduction gear ratio of the set formed by the toothed sector 42, the small pinion 44 and the toothed wheels 50 and 52 is for example from about 4 to 5. Driving the inertial mass 54, which results from the rotation of the shaft 10 provides inertia which allows the jogs and the noises and vibrations transmitted by the gearbox to the control lever L to be filtered.

The association of a reduction gear and an inertial mass allows the inertial mass to be set into motion while consuming less energy.

This also allows the use of an inertial mass 54 with a reduced mass, which is therefore less bulky and less expensive.

When the gearbox outlet module is equipped with permanent magnets as described with reference to FIGS. 1 to 4, it becomes possible to suppress the inertial mass 54, while possibly retaining the reduction gear formed by the toothed sector 42, the small pinion 44 and the toothed wheels 50 and 52, in order to improve acceptance of the gearbox control by means of an increase in the inertia which results from the reduction gear and of a reduction in the force on the lever which results from the suppression of the inertial mass(es) 54.

The invention claimed is:

1. A device for controlling a gearbox, in particular for a motor vehicle, comprising at least one mobile permanent magnet displaceable by a control lever in front of three groups of fixed permanent magnets borne by a support and cooperating by magnetic attraction or repulsion with the at least one mobile permanent magnet in order to define at least one position of the lever and to compensate the play of the lever in this position, wherein the mobile permanent magnet is borne by a transmitter means driving the end of a shaft for selecting and changing gears, emerging from the casing of the gearbox and wherein the group of fixed permanent magnets is borne by the casing of the gearbox, and wherein the at least one mobile permanent magnet is displaceable in rotation and in translation in front of the three groups of fixed magnets defining stable neutral gear, gear selecting and gear changing positions and exerting on the at least one mobile permanent magnet, restoring forces towards these stable positions, and wherein the three groups of fixed permanent magnets are distributed along the trajectory in rotation of the at least one mobile permanent magnet and extend parallel to the translational direction of the at least one mobile permanent magnet over a length substantially equal to the translational travel of the at least one mobile permanent magnet.

2. The device according to claim 1, wherein the fixed permanent magnets are borne by a component mounted in an orifice of the casing of the gearbox for guiding and sealing the shaft at the exit of the shaft for selecting and changing gears from the gearbox.

3. The device according to claim 1, wherein the fixed permanent magnets comprise magnets having a first polarity, spaced apart from each other along at least one trajectory of the at least one mobile permanent magnet in order to define several positions of the lever, and magnets having a second polarity, placed between the magnets having the first polarity in order to generate forces for restoring the lever back to these aforementioned positions or for creating ball detent points between these positions.

4. The device according to claim 1, wherein at least one of the at least one mobile permanent magnet is attached on said transmitter means which is integral with the end of the shaft for selecting and changing gears at the exit of the shaft for selecting and changing gears from the gearbox and is displaceable in front of three fixed magnets which have a polarity opposite to that of the mobile magnet.

5. The device according to claim 1, wherein a first mobile magnet is borne by a first transmitter means which is connected to the end of the shaft for selecting and changing gears at the exit of the shaft for selecting and changing gears from the gearbox in order to drive it into translation along its longitudinal axis or in rotation around this axis and is displaceable in front of fixed magnets defining gear selecting positions.

6. The device according to claim 1, wherein the fixed permanent magnets comprise first magnets having a first polarity which are spaced apart from each other along at least one trajectory of the mobile magnet in order to define positions of the lever, and magnets having a second polarity, positioned around the magnets having the first polarity in order to generate forces for maintaining or restoring the lever in its aforementioned positions.

7. The device according to claim 6, wherein the magnets having the second polarity comprise ring-shaped magnets each surrounding a magnet having the first polarity.

8. The device according to claim 1, wherein the said shaft for selecting or changing gears is connected to a reduction gear housed in a gearbox outlet casing.

9. The device according to claim 8, wherein the reduction gear connects the shaft for selecting or changing gears to an inertial mass housed in the gearbox outlet casing.

10. The device according to claim 9, wherein the inertial mass is a disk or a crown guided in rotation around the axis of the shaft for selecting or changing gears.

* * * * *